US009573093B2

(12) United States Patent
Menzel

(10) Patent No.: US 9,573,093 B2
(45) Date of Patent: Feb. 21, 2017

(54) HEAT RECOVERY IN ABSORPTION AND DESORPTION PROCESSES

(75) Inventor: Johannes Menzel, Waltrop (DE)

(73) Assignee: THYSSENKRUPP INDUSTRIAL SOLUTIONS GMBH, Essen (DE)

(*) Notice: Subject to any disclaimer, the term of this patent is extended or adjusted under 35 U.S.C. 154(b) by 245 days.

(21) Appl. No.: 14/235,049

(22) PCT Filed: Jun. 27, 2012

(86) PCT No.: PCT/EP2012/002689
§ 371 (c)(1),
(2), (4) Date: Oct. 27, 2014

(87) PCT Pub. No.: WO2013/013749
PCT Pub. Date: Jan. 31, 2013

(65) Prior Publication Data
US 2015/0078973 A1  Mar. 19, 2015

(30) Foreign Application Priority Data
Jul. 28, 2011  (DE) .................. 10 2011 108 749

(51) Int. Cl.
B01D 53/14 (2006.01)
C01B 3/52 (2006.01)
C10L 3/10 (2006.01)

(52) U.S. Cl.
CPC ....... *B01D 53/1475* (2013.01); *B01D 53/1425* (2013.01); *C01B 3/52* (2013.01);
(Continued)

(58) Field of Classification Search
CPC ............ B01D 2259/65; B01D 53/1425; B01D 53/1456; C01B 2203/0415; C01B 2203/0475; C01B 2203/0485; C01B 3/52; C10L 2290/541; C10L 3/102; Y02P 20/57
See application file for complete search history.

(56) References Cited

U.S. PATENT DOCUMENTS 4,152,217 A  5/1979 Eisenberg et al.
7,604,684 B2  10/2009 Menzel
(Continued)

FOREIGN PATENT DOCUMENTS

DE  102005030028  12/2006
EP  0133208  2/1985
(Continued)

OTHER PUBLICATIONS

International Search Report for PCT/EP2012/002689, English translation attached to original, Both completed by the European Patent Office on Sep. 19, 2012, All together 7 Pages.

Primary Examiner — Duane Smith
Assistant Examiner — Cabrena Holecek
(74) Attorney, Agent, or Firm — Brooks Kushman P.C.

(57) ABSTRACT

A method for removing components to be separated from industrial gases using an absorption and desorption processes having liquid absorbents. At least one absorption device and one desorption device are provided, at least a part of the laden solution leaving the absorption device is diverted before being heated and delivered to the head of the heat transfer section. The laden partial stream is heated by the steam rising from the lower part of the desorption device through heat exchange in the heat transfer section. The remaining stream of cold, laden solution leaving the absorption device is expanded by so the relief valve and the heat exchanger into a pressure relief vessel, such that the stream leaving the heat exchanger separates into a liquid and a gaseous state. The pressure in the pressure relief vessel pressure is lowered so that the total energy demand in absorption and desorption processes is reduced.

15 Claims, 3 Drawing Sheets

(52) U.S. Cl.
CPC .......... *C10L 3/102* (2013.01); *B01D 53/1456* (2013.01); *B01D 2252/2021* (2013.01); *B01D 2252/2025* (2013.01); *B01D 2252/2026* (2013.01); *B01D 2252/20431* (2013.01); *B01D 2259/65* (2013.01); *C10L 2290/541* (2013.01); *Y02P 20/124* (2015.11); *Y02P 20/57* (2015.11)

(56) References Cited

U.S. PATENT DOCUMENTS

| | | | |
|---|---|---|---|
| 8,535,427 | B2 | 9/2013 | Iijima et al. |
| 8,557,205 | B2 | 10/2013 | Richter et al. |
| 2004/0036055 | A1 | 2/2004 | Asprion et al. |
| 2006/0196357 | A1* | 9/2006 | Menzel .............. B01D 53/1406 95/235 |
| 2007/0283813 | A1* | 12/2007 | Iijima ................ B01D 53/1406 96/235 |
| 2009/0199709 | A1* | 8/2009 | Rojey ................ B01D 53/1425 95/46 |
| 2009/0199712 | A1 | 8/2009 | Menzel et al. |
| 2011/0020203 | A1 | 1/2011 | Eksilioglu et al. |

FOREIGN PATENT DOCUMENTS

| | | | |
|---|---|---|---|
| EP | 1736231 | 12/2006 | |
| EP | 1606041 | 4/2008 | |
| WO | 2010086039 | 8/2010 | |
| WO | WO 2011049767 A3 * | 6/2011 | .......... B60H 1/3232 |

* cited by examiner

HEAT RECOVERY IN ABSORPTION AND DESORPTION PROCESSES

CROSS-REFERENCE TO RELATED APPLICATION

This application is the U.S. national phase of PCT Application No. PCT/EP2012/002689 filed on Jun. 27, 2012, which claims priority to German Patent Application No. 10 2011 108 749.8 filed on Jul. 28, 2011, the disclosures of which are incorporated in their entirety by reference herein.

BACKGROUND OF THE INVENTION

1. Field of the Invention

The present invention relates to an economical process for the removal of components to be separated from technical gases in absorption and desorption processes.

2. Description of the Related Art

Such technical gases are mostly natural gas or synthesis gas, the synthesis gas being generated from fossil raw materials such as crude oil or coals and from biological raw materials. Natural gas and synthesis gas contain useful valuable gases but also interfering components, such as sulphur compounds, in particular sulphur dioxide, carbon dioxide and other components to be separated such as hydrogen cyanide and water vapour. Beside natural gas and synthesis gas, flue gases from an incineration of fossil fuels are also included in the group of technical gases from which interfering components as, for example, carbon dioxide, are removed. The components to be separated may also be useful gases which are to be separated for a specific purpose.

Both physical and chemical absorbents can be used for absorption. Chemically acting absorbents are, for example, aqueous amine solutions, alkali salt solutions, etc. Selexol, propylene carbonate, N-methyl-pyrrolidone, morphysorb, methanol, etc. are physical absorbents.

It is known from prior art to remove components to be separated from technical gases in a circuit by means of absorption and desorption processes. The components to be separated are absorbed in the absorption device by the liquid absorbent. The gas which is insoluble in the solvent leaves the absorption device at the top, whereas the components to be separated remain in dissolved state in the liquid absorbent and leave the absorption device at the bottom. Before the laden solution is fed to the top of the desorption device for desorption, the laden solution is usually pre-heated by heat exchange with the hot, regenerated solution, by which part of the energy required for the desorption in the desorption device is recovered.

By means of a heating agent, a reboiler at the bottom of the desorption device serves to generate steam by partial evaporation of the solvent at the bottom inside the desorption device. Here, the generated steam serves as stripping agent to remove the components to be separated from the laden solution. The laden solution is freed by the stripping agent in countercurrent from the absorbed components to be separated. The stripped components to be separated leave the desorption device at the top, with the steam fraction of the stripping agent being condensed in a head condenser and returned to the desorption device. The regenerated solution which has been freed from the components to be separated leaves the desorption device at the bottom, with the solution usually being cooled after heat exchange has been carried out and returned to the top of the absorption device. This concludes the circuit of the absorption and the desorption process.

In the absorption, which in most cases is carried out at a working pressure of 1 to 100 bar, an absorption temperature of 20° C. to up to 70° C. has proved to be advantageous for removing the components to be separated from the technical gas.

The solution laden with the components to be separated can be regenerated by flashing to a lower pressure and/or stripping, the components to be separated being released again and/or stripped by means of steam. Upon completion of the regeneration process the absorbent can be cooled as required and used again.

The temperature required for desorption in a desorption device is higher than the temperature for absorption by means of the absorbent in an absorption device. The desorption device is usually operated at a temperature of 80° C. to 140° C. and an absolute pressure of 0.2 to up to 3 bar.

In absorption and desorption processes, heat recovery can be achieved in a heat exchanger by heat exchange between absorption solution to be heated and absorption solution to be cooled. This heat exchange serves on the one hand to pre-heat the fluid to be heated in a desirable manner, on the other hand the fluid to be cooled is cooled in a likewise desirable manner, so that the energy required for regeneration and supplied from external sources is significantly reduced.

Even in the case of an ideal heat exchange, in which the temperature approximation between the hot, regenerated solution and the heated laden solution is nearly zero, the absorption and desorption processes still require a lot of external energy for the regeneration of the solvent. For economical reasons, the heat exchanger is usually designed for a minimum temperature approximation of approx. 10 K between the hot, regenerated solution and the heated, laden solution. This results in an increase of the regeneration energy demand to be met by external sources.

EP 1 606 041 B1 discloses a method for the selective removal of sour-gas components from natural gas or synthesis gas, with the sour-gas components being removed selectively within two absorption stages by flashing the laden solution in two stages in a flash vessel to a selected pressure and then introducing it for desorption into the desorption device.

Another method for removing sour gas from natural gas is disclosed in DE 10 2005 030 028 A1 where the pressure of the laden solution between the absorption column and the stripping column is controlled stepwise in a way to ensure that as little additional energy as possible is required.

WO 2010/086039 A1 describes a method and a device for separating carbon dioxide from an exhaust gas of a fossil-fired power plant. The absorption and desorption process connected to the power plant combines the "split feed" and the "lean solvent flash" operating modes, in which a more favourable overall plant efficiency of the power plant process is only achieved if the two process stages are combined. The application of the method according to WO 2010/086039 A1 involves a significantly greater demand for equipment than in prior art, as it would here be necessary to install both a vacuum compression stage and another compression stage.

EP 1 736 231 A1 discloses a method and an apparatus for the removal of carbon dioxide, with several variants aiming at improving the energy efficiency being presented. On account of the thermal connection described, however, it is possible to recover only part of the energy which is supplied to the regeneration device, as most of the energy which is still contained in the exhaust steam from the flash vessel described in the disclosure is not recycled to the regeneration device but removed by an external cooler, thus being lost for the system. To ensure that the heat is transferred in an adequate manner from and to the enriched solution of the flash vessel, there is a significantly greater demand for equipment in form of additional heat exchangers, coolers, etc. A necessary intermediate feed in the absorber, for example, increases the required overall height of the absorber and thus also the cost.

On account of the increasing demand for resources an economical mode of operation in all fields has long become an important basis for the further development. The aim is therefore to provide an efficient and cost-saving process by which the energy demand of the whole plant is reduced.

SUMMARY OF THE INVENTION

Aims of the invention are therefore to provide an economically improved process for the removal of components to be separated from technical gases by means of absorption and desorption processes including heat recovery, to particularly further reduce the demand for external energy. The aims are achieved by a process for the removal of components to be separated from technical gases, with the process being implemented by means of absorption and desorption processes using liquid absorbents, in which at least one absorption device (20) is provided, which includes at least one mass transfer section where the components to be separated are absorbed by the liquid absorbent, and at least one desorption device (22) is provided, with the desorption device (22) comprising at least one heat transfer section (22a), a stripping section (22b) and a reboiler (23) at the bottom, with the heat transfer section (22a) being located above the stripping section (22b) and the temperature in the desorption device (22) being higher than the temperature in the absorption device (20).

DETAILED DESCRIPTION OF THE PREFERRED EMBODIMENTS

Figure 1:
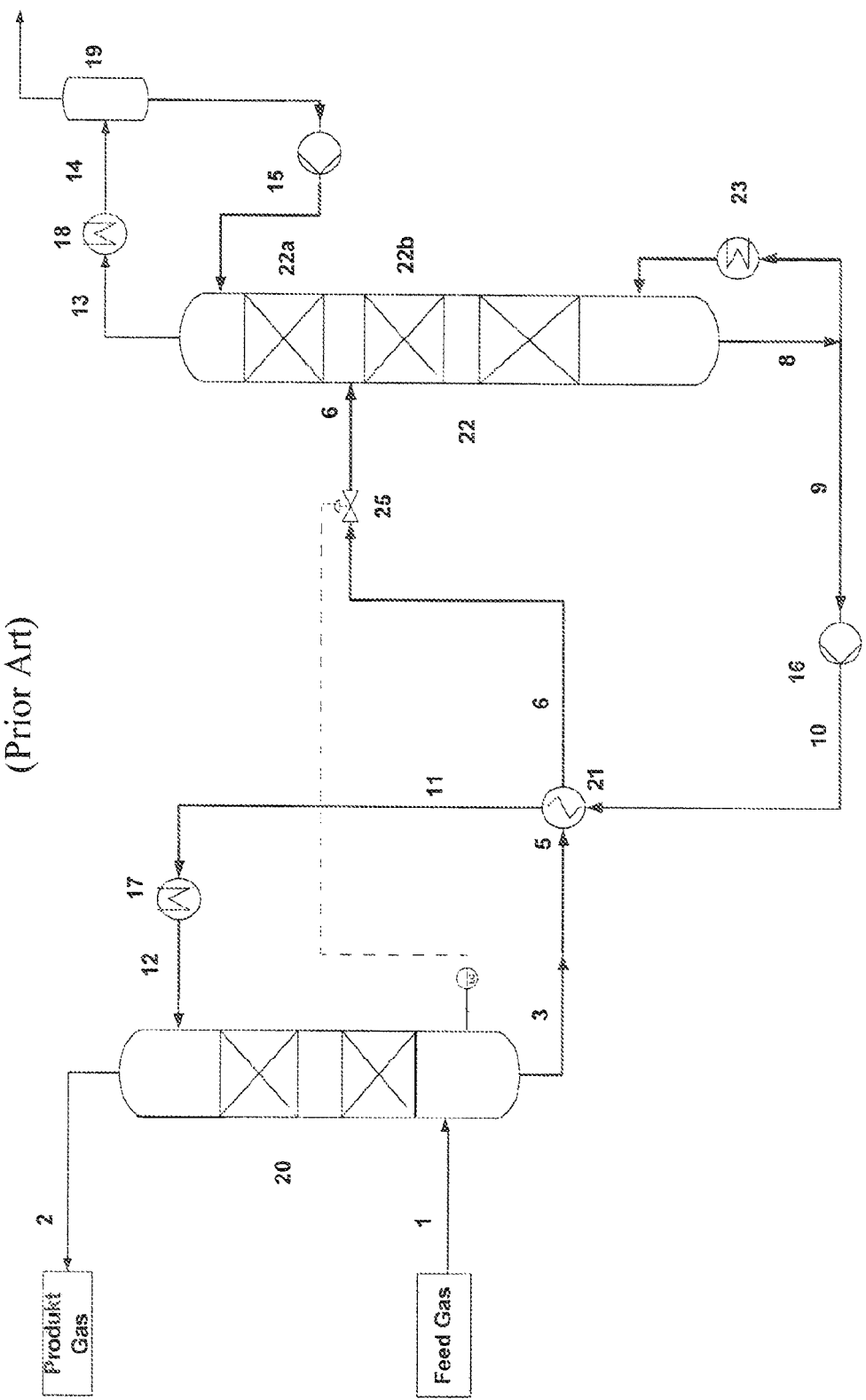
FIG. 1 represents a prior art process for removal of technical gases.

The solution leaving the absorption device (20) and laden with the components to be separated is heated by a heat exchanger before this solution is fed to the desorption device (22). The additional energy required by the desorption is supplied by the reboiler (23) at the bottom of the desorption device (22). The components to be separated, which have been stripped off by the stripping agent, leave the top of the stripping section (22b) as exhaust steam, which is then introduced into the heat transfer section (22a), cooled as required and leaves the desorption device (22) at the top. The solution which, after desorption, is free of the components to be separated leaves the desorption device (22) at the bottom, undergoes heat exchange with the enriched solution in the heat exchanger (21), is then cooled and returned back to the absorption device (20).

At least part of the laden solution leaving the absorption device (20) is branched off before being heated and fed to the top of the heat transfer section (22a). This laden part-stream is heated by the steam rising from the bottom part of the desorption device (22b) via heat exchange in the heat transfer section (22a). The residual stream of cold, laden solution (5a) leaving the absorption device (20) is flashed by means of the relief valve (25) and via the heat exchanger (21) into a flash vessel (26), so that the stream leaving the heat exchanger (21) is separated into a liquid and a gas phase, the pressure in the flash vessel (26) being reduced to such an extent that the whole energy demand in the absorption and desorption processes is reduced.

In the heat exchanger (21) heat is transferred from the regenerated solution to the enriched solution. For economical reasons, the temperature difference between the hot, regenerated solution and the heated, laden solution as well as between the cooled, regenerated solution and the cold, laden solution to be heated should normally not be smaller than 10 K. In the event that only a part-stream of the cold, laden solution is available for cooling the large mass flow of the regenerated solution, the resulting temperature difference will inevitably be greater than 10 K, as the mass flow of the enriched solution is smaller than the mass flow of the regenerated solution. To utilise the heat of the regenerated solution as fully as possible in spite this and to reduce the temperature difference between the cooled, regenerated solution and the cold, laden solution to be heated to approx. 10 K again, the pressure on the side of the enriched solution stream is lowered in accordance with the invention by means of the relief valve (25) in the heat exchanger (21) such that by the resulting partial evaporation of the laden solution more heat is transferred from the hot, regenerated solution to the cold, laden solution. In this way, the heat present in the circuit and in the desorption device is efficiently utilised causing a reduction of the amount of external energy required in the boiler (23). The gain in energy results from the fact that according to the process embodying the invention the heat exchanger, despite the smaller mass flow, transfers the same amount of heat as according to the state of the art, with the whole mass flow of the enriched solution being passed through the heat exchanger and, in addition, the energy which is transferred from the stripping steam in the heat transfer section (22a) to the part-stream of the enriched solution being recovered. This reduces the overall energy demand in absorption and desorption processes.

The reboiler at the bottom of the desorption device (22) generally ensures continuous supply of the required heat, in which the the stripping agent is heated to stripping steam by the reboiler. The stripping steam strips the components to be separated from the liquid solvents. The steam released by the pressure reduction in the flash vessel (26) is withdrawn from the top of the flash vessel (26) and fed below the heat transfer section (22a), with the steam transferring its heat to the solution to be heated and cooling down as desired. The cooled, separated components leave the desorption device at the top and are ready for downstream processing, with no condenser or only a significantly smaller condenser being required to cool down the separated components.

It is known that a certain pressure is required to convey the solution through the heat exchanger and subsequently to the top of the desorption device. Thus, according to the state of the art, a pressure of approx. 5 to 6 bar is required downstream the heat exchanger (21). This input pressure is required to overcome the geodetic height of the desorption device, to compensate the line resistance and to dispose of sufficient control reserves in the relief control valve of the desorption device. Further input pressure is required to reach the normal working pressure of the desorption device. On account of the high input pressure, the steam fraction in the laden solution after being heated in the heat exchanger (21) is correspondingly low. The pressure in the heat exchanger can now be reduced to a pressure allowing significantly higher partial evaporation in the heat exchanger. According to the invention the pressure in the flash vessel (26) is reduced to a pressure which is maximally 1.5 bar larger than the pressure at the top of the desorption device (22). As a result, the flashed gas phase can be fed to the desorption device (22) without further ado.

Depending on the solvent, the pressure may be reduced to down to 1 or even 0.1 bar greater than the pressure at the top of the desorption device (22). If the pressure is reduced to down to 0.1 bar greater than the pressure at the top of the desorption device (22), the steam fraction will increase. The pressure may—if advantageous—be reduced to below the pressure at the top of the desorption device (22); in such case a gas compressor is required for conveying the gas phase to the top of the desorption device.

Pressure reduction can also be implemented in several flash vessels connected in series. This is of advantage in cases where it is intended to reduce the flash pressure to below the pressure in the desorption device, since in that case it is only this fraction of the steam that needs to be compressed to subsequently feed it to the desorption device.

The steam released by pressure reduction in the flash vessel (26) is withdrawn from the top of the flash vessel (26) and fed above the stripping section (22b) of the desorption device (22).

The liquid fraction released by the pressure reduction in the flash vessel (26) is withdrawn from the bottom of the flash vessel (26) and fed to the stripping section (22b) of the desorption device (22) to strip the remaining components to be separated from the solvent.

Heating in the heat transfer section (22a) may be implemented by direct or indirect heat transfer. The exhaust steam rising from the stripping section (22b) transfers its heat to the laden solution to be heated. In the case of direct heat transfer, the heat transfer section (22a) is provided with a mass transfer section, which is equipped with mass transfer elements where direct heat transfer is implemented, in which all internals of a column used for heat and mass exchange, such as packing material, structured packings, trays (bubble, valve, sieve trays), etc. can be used as mass transfer elements. The laden solution which trickles downwards absorbs the heat from the rising exhaust steam while the exhaust steam is being cooled accordingly. In the case of indirect heat transfer, the heat transfer section (22a) can be provided in the form of a heat exchanger where indirect heat transfer is implemented. This process vessel on the one hand cools the rising exhaust steam as required and on the other hand heats the laden solution to be heated as desired.

The relief valve (25), heat exchanger (21) and flash vessel (26) are generally arranged on the floor. An advantageous arrangement of the process vessels can, for example, provide for the relief valve (25), heat exchanger (21) and flash vessel (26) being located above the level of the stripping section (22b). In this way, no additional pump is required for conveying the solution from the flash vessel (26) and to the top of the desorption device. The devices can, however, be arranged in any desired form to run the process embodying the invention.

The part-stream heated in the heat transfer section (22a) is fed to the stripping section (22b).

This process can be run with a physically or a chemically acting absorbent. The process can be used in particular for the removal of sour-gas components from technical gases.

The process embodying the invention is explained below by means of drawings and tables referring to an example.

From a crude gas of approx. 13% by vol. $CO_2$, approx. 90% of the $CO_2$ contained in the crude gas shall be removed, with the amount of crude gas being 150,000 $Nm^3/h$. The $CO_2$ components to be separated shall be removed by means of an aqueous MDEA solution as absorbent at a solvent recycle rate of approx. 1100 t/h. The use of a process simulation program yields the following results:

TABLE 1

Figure 2:
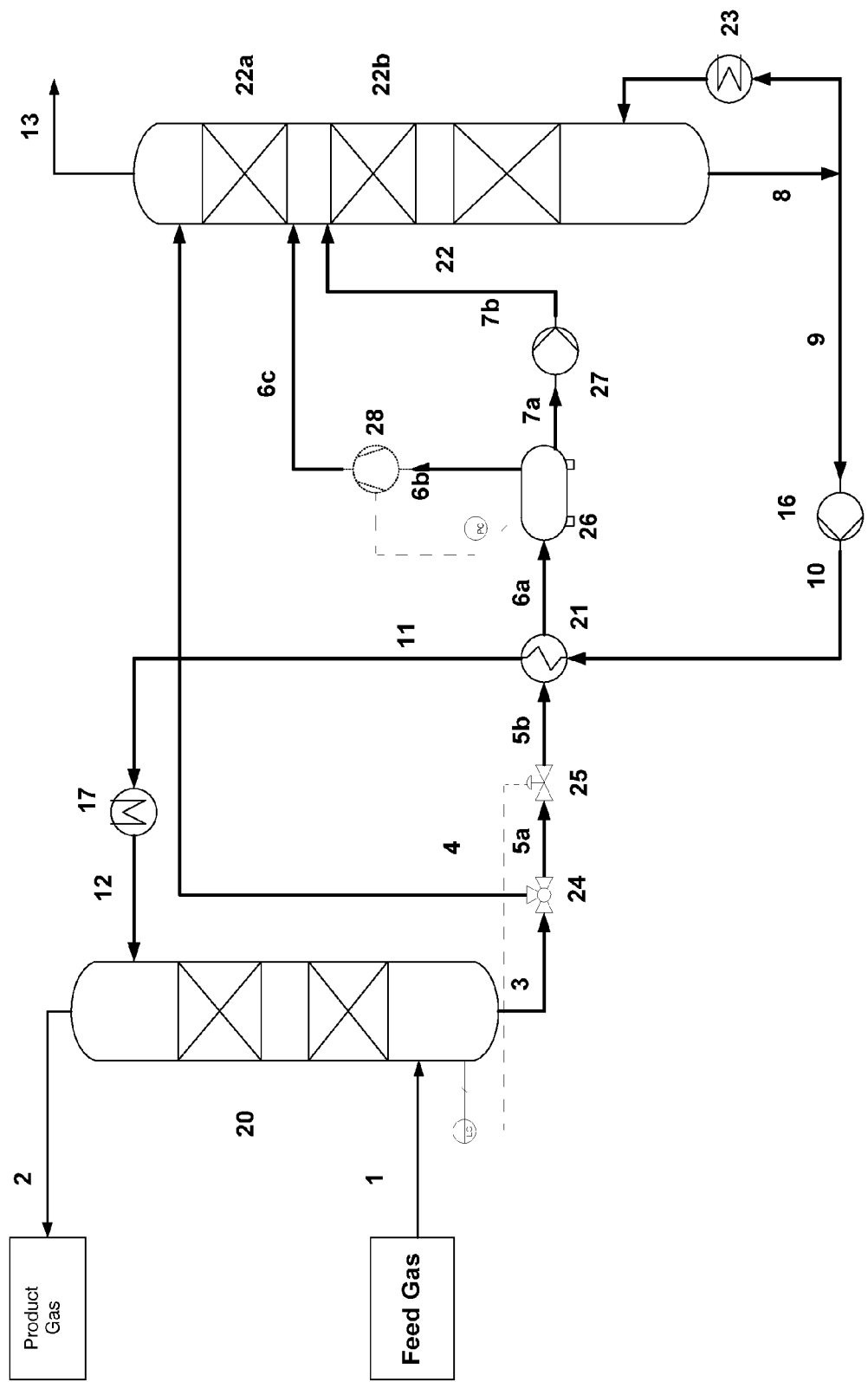
FIG. 2 represents one embodiment of the invention.

| | | State of the art (FIG. 1) | Process embodying the invention (FIG. 2) | State of the art (FIG. 3) |
|---|---|---|---|---|
| $CO_2$, crude gas | kmol/h | 870 | 870 | 870 |
| $CO_2$, purified gas | kmol/h | 95.6 | 96.3 | 95.2 |
| $CO_2$, exhaust gas | kmol/h | 774 | 773.4 | 774.8 |
| Recycling solvent, reg. (9, 10) | $m^3/h$ | 1166 | 1169 | 1185 |
| Solvent stream (4) | $m^3/h$ | 0 | 248 | 250 |
| Laden solution, HE, in (5b) | °C. | 41.1 | 41.1 | 40.9 |
| Laden solution, HE, out (6a) | °C. | 113 | 115 | 115 |
| Reg. solution, HE, in (10) | °C. | 125.4 | 125.2 | 124.8 |
| Reg. solution, HE, out (11) | °C. | 48.4 | 52.1 | 62.9 |
| Pressure, laden solution, HE, out | bar | 4.5 | 2.2 | 4.5 |
| Steam fraction, laden solution (6a) | % | 2 | 6 | 2 |
| Heat transferred | MW | 96.2 | 91.7 | 79.1 |
| Logarithmic temp. diff. | °C./K | 9.6 | 10.6 | 15.1 |
| Heat exchange surface (21) | $m^2$ | 12700 | 10700 | 6500 |
| Reboiler output (23) | MW | 31 | 23 | 34.5 |

According to the process embodying the invention the laden solution leaving the absorption device is divided into two streams, with the share of the residual stream (5a, 5b) amounting to approx. (1169−248)/1169=79% in the total recycling solvent stream. Even though only approx. 79% of the total solvent stream can be used, nearly the same energy amount as according to the state of the art can be transferred to the desorption device by means of the heat exchanger.

Figure 3:
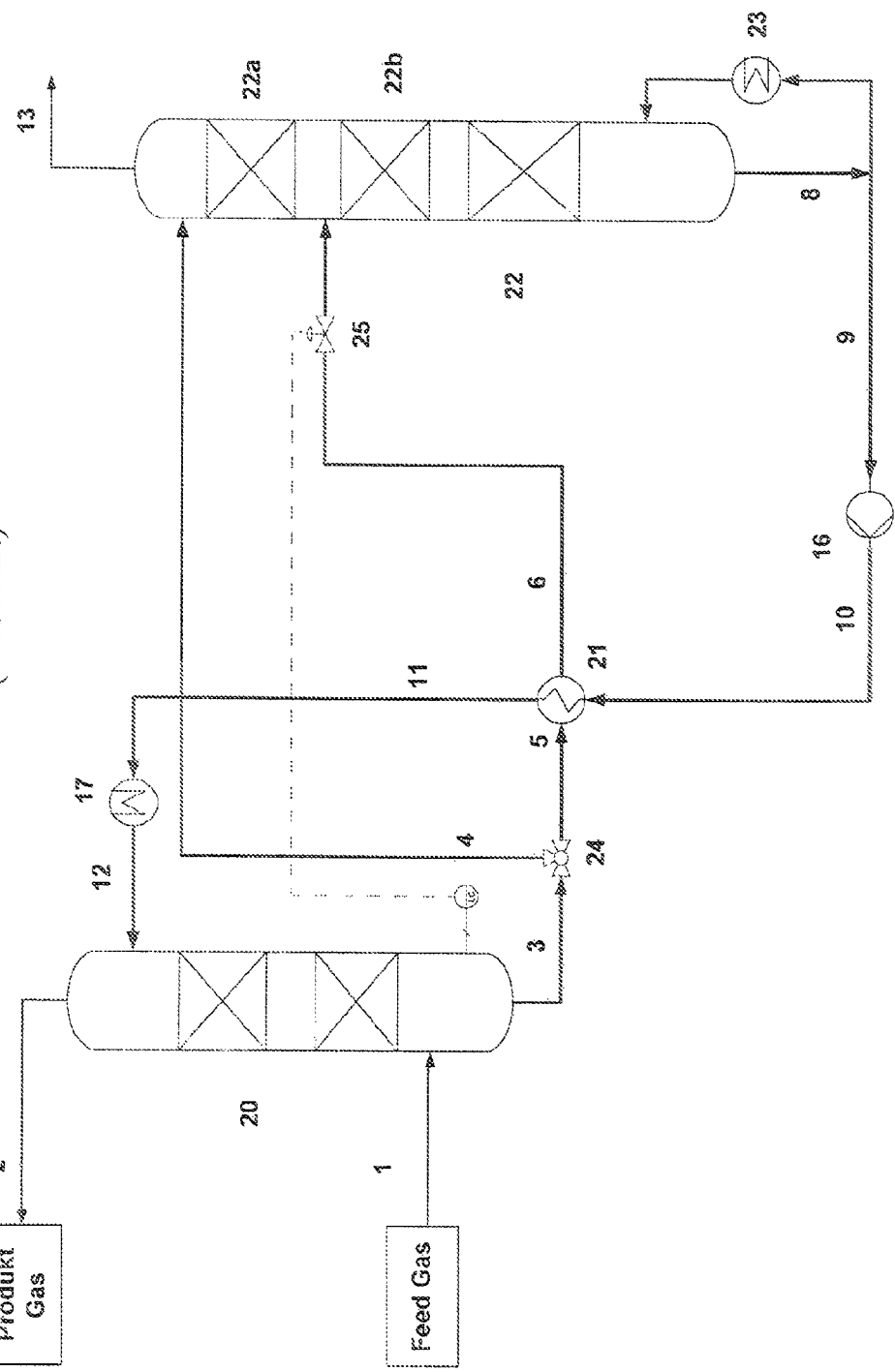
FIG. 3 represents a prior art process.

In FIG. 3 the laden solution is passed through a heat exchanger without reducing the pressure. One recognises here that evidently less heat (79.1 MW) is transferred to the desorption device so that in the end even approx. (34.5−31)/31=11% more external energy are required for the desired removal of $CO_2$. This means that the pressure reduction adapted to the requirements of the solvent is essential for the mode of operation according to the invention.

The mode of operation according to the invention, however, allows operating with significantly less external energy in the desorption device. In this example, up to (31−23)/31=26% of the externally required energy in the reboiler can be saved for the regeneration of the solution.

The table also shows that the steam fraction of 6% in the mode of operation according to the invention is significantly higher than that achieved according to the state of the art.

LIST OF REFERENCE NUMBERS AND DESIGNATIONS

1 Feed gas
2 Product gas
3 Laden solution stream
4 Laden part-stream

5a Laden residual stream upstream of the relief valve
5b Laden residual stream downstream of the relief valve
6, 6a Pre-heated stream
6b, 6c Steam phase of the flashed solution
7a, 7b Liquid fraction of the flashed solution
8, 9 Regenerated solvent stream
10 Regenerated solvent stream
11 Solvent stream after heat exchange
12 Cooled regenerated solution
13 Separated component
14 Cooled separated component
15 Reflux pump
16, 27 Pump
17 Heat exchanger
18 Heat exchanger
19 Reflux drum
20 Absorption device
21 Heat exchanger
22 Desorption device
22a Heat transfer section
22b Stripping section
23 Heat exchanger
24 Branch
25 Relief valve
26 Flash vessel
28 Compressor

The invention claimed is:

1. A process for the removal of at least one of sour-gas components, sulfur compounds, carbon dioxide, hydrogen cyanide, water, or combinations thereof as components to be separated, from natural gas, synthesis gas, flue gas from incineration of fossil fuels or combinations thereof as a technical gas, by an absorption and desorption process using a liquid absorbent, with reduced energy demand, the process comprising:

absorbing the components to be separated into the liquid absorbent in an absorption device containing at least one mass transfer section, forming a laden absorbent solution;

desorbing the components to be separated from the laden absorbent solution in a desorption device comprising at least one heat transfer section, at least one stripping section below the heat transfer section, and a bottom reboiler, the desorption device operated at a higher temperature than the absorption device;

splitting the laden absorbent solution into a first part stream and a second part stream;

heating the second part stream in a heat exchanger and supplying heat to the heat exchanger from a bottoms stream of absorbent from the desorption device, the bottoms stream free of components to be separated;

wherein between the heat exchanger and the desorption device is at least one relief valve and a subsequent flash vessel, and flashing the second part stream of the laden absorbent solution by means of the relief valve, separating the laden absorbent solution into a liquid phase and a gas phase, thus lowering the pressure in the subsequent flash vessel, and removing the components to be separated as an exhaust stream from the stripping section, and introducing the exhaust stream into the heat transfer section of the absorption device and cooling the exhaust stream by routing the first part stream of laden absorbent solution to the top of the absorbent solution to the top of the heat transfer section of the desorption device, and removing a cooled exhaust stream of components to be separated; and routing a cooled stream of absorbent free of component to be separated from the heat exchanger to the absorption device.

2. The process of claim 1, wherein the heat transfer section for the desorption device is provided with a mass transfer section comprising mass transfer elements for direct heat transfer.

3. The process of claim 1, wherein the heat transfer section of the desorption device comprises a heat exchanger for indirect heat transfer.

4. The process of claim 1, wherein the adsorbent is a physically acting absorbent.

5. The process of claim 1, wherein the adsorbent is a chemically acting absorbent.

6. The process of claim 1, wherein the components to be separated comprise sulfur dioxide, carbon dioxide, hydrogen cyanide, or a combination thereof.

7. The process of claim 1, wherein the adsorbent comprises at least one of an aqueous amine solution or alkali salt solution.

8. The process of claim 1, wherein the liquid absorbent comprises at least one selexol, propylene carbonate, N-methyl-pyrrolidone, morphysorb, or methanol.

9. The process of claim 1, wherein the liquid absorbent comprises at least one of propylene carbonate, N-methyl-pyrrolidone, or methanol.

10. The process of claim 1, wherein the pressure of the flash vessel is maximally 1.5 bar greater than the pressure in the desorption device between the heat transfer section and the stripping section.

11. The process of claim 10, wherein the gas phase from the flash vessel is fed to the desorption device above the stripping section.

12. The process of claim 10, wherein the liquid phase from the flash vessel is fed to the stripping section of the desorption device.

13. The process of claim 1, wherein a plurality of series connected flash vessels are used.

14. The process of claim 13, wherein the gas phase from the flash vessel is fed to the desorption device above the stripping section.

15. The process of claim 13, wherein the liquid phase from the flash vessel is fed to the stripping section of the desorption device.

* * * * *